United States Patent [19]
Goto

[11] Patent Number: 5,515,358
[45] Date of Patent: May 7, 1996

[54] DISK CARTRIDGE AND METHOD FOR CONSTRUCTING THE SAME

[75] Inventor: Yoshikazu Goto, Hirakata, Japan

[73] Assignee: Matsushita Electric Industrial Co., Ltd., Osaka, Japan

[21] Appl. No.: 180,901

[22] Filed: Jan. 12, 1994

[30] Foreign Application Priority Data

Jan. 14, 1993 [JP] Japan .................... 5-004648

[51] Int. Cl.⁶ .................................... G11B 23/03
[52] U.S. Cl. .......................... 369/291; 360/133
[58] Field of Search ................. 29/225; 369/291, 369/77.2; 360/133

[56] References Cited

U.S. PATENT DOCUMENTS

| | | | |
|---|---|---|---|
| 4,497,009 | 1/1985 | Oishi et al. | 360/133 |
| 4,550,354 | 10/1985 | Wakabayashi | 360/133 |
| 4,680,662 | 7/1987 | Fukushima | 360/133 |
| 4,782,418 | 11/1988 | Tanaka | 360/133 |
| 4,839,953 | 6/1989 | Mizuta | 29/225 |
| 4,908,817 | 3/1990 | Sandell | 369/291 |
| 4,945,530 | 7/1990 | Sandell | 369/291 |
| 5,051,857 | 9/1991 | Akiyama | 360/133 |
| 5,065,391 | 11/1991 | Funaki | 369/291 |
| 5,072,326 | 12/1991 | Ikebe | 360/133 |
| 5,073,889 | 12/1991 | Rayner | 369/291 |
| 5,121,277 | 6/1992 | Ikebe | 360/133 |
| 5,166,922 | 11/1992 | Akiyama | 369/291 |

FOREIGN PATENT DOCUMENTS

61-236083 10/1986 Japan .

*Primary Examiner*—Stuart S. Levy
*Assistant Examiner*—Paul J. Ditmyer
*Attorney, Agent, or Firm*—Renner, Otto, Boisselle & Sklar

[57] ABSTRACT

A disk cartridge rotatably accommodating a disk according to the present invention includes: a cartridge box composed of an upper half and a lower half, including a center hole for receiving a motor for rotating the disk, a head slit for receiving a recording and playback head, and a window on its side wall; a shutter movably provided on the cartridge box, for opening or closing at least the head slit; a slide member covering the window, connected to the shutter and slidably guided inside the cartridge box so that the shutter moves in a direction for opening or closing the head slit; and a twisted coiled spring which is provided inside the cartridge box so as to pass thorough the window, one end of the elastic body being fixed to the cartridge box and the other end thereof being fixed to the slide member, the elastic body pulling the shutter in a direction for closing the head slit.

22 Claims, 7 Drawing Sheets

DISK CARTRIDGE AND METHOD FOR CONSTRUCTING THE SAME

BACKGROUND OF THE INVENTION

1. Field of the Invention

The present invention relates to a disk cartridge for accommodating a disk-shaped information recording medium, used for an information storage device such as a data file device and an image file device, and a method for constructing the same.

2. Description of the Related Art

A write once read many type or rewritable type optical disk is generally accommodated in a cartridge for protection against dust. Such a conventional cartridge is exemplified in Japanese Laid-Open (Kokai) Patent Publication No. 61-236083 (U.S. Pat. No. 4,680,662), which will be shown with reference to FIGS. 14 and 15.

Figures 14, 15, 16:
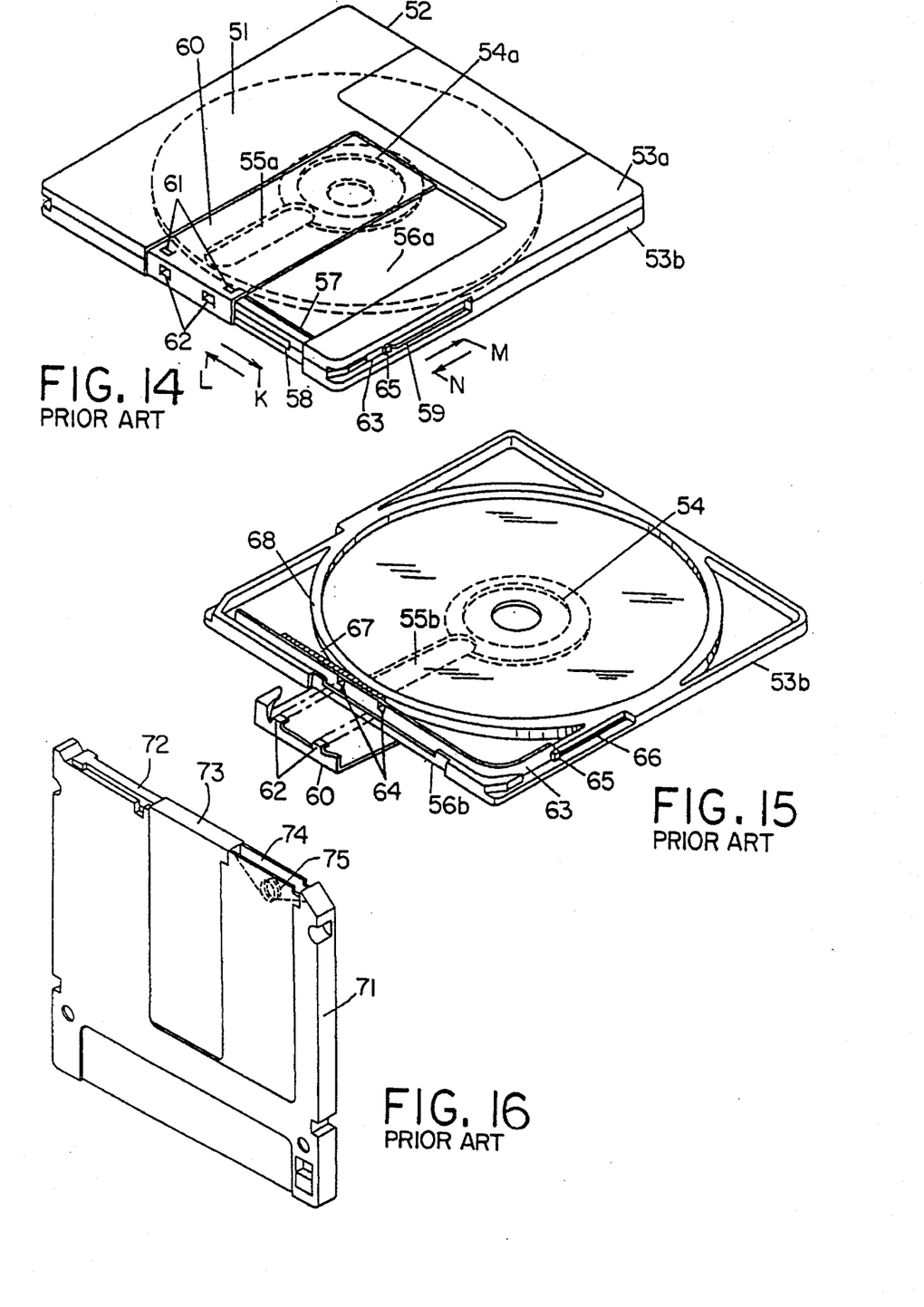
FIG. 14 is a perspective view of a disk cartridge of a first conventional example.
FIG. 15 is a perspective view of a lower half of the disk cartridge of the first conventional example.
FIG. 16 is a perspective view of a disk cartridge of a second conventional example.

As shown in FIG. 14, the cartridge includes a cartridge box 52 for rotatably accommodating a disk 51. The cartridge box 52 is formed into a substantially rectangular shape consisting of an upper half 53a and a lower half 53b. The upper and lower halves 53a and 53b are provided with center holes 54a, 54b (see FIG. 15) for receiving a disk motor, head slits 55a, 55b (see FIG. 15) for receiving a head, and concave portions 56a. 56b opposing to each other. The concave portions 56a, 56b respectively have a guide groove 57 for a shutter 60 (described later).

The cartridge further includes the shutter 60 consisting of three sheets (two of the sheets facing each other) for opening or closing the center holes 54a, 54b and the head slits 55a, 55b. The shutter 60 is provided with projections 61 and clicks 62. The projections 61 are inserted in the guide groove 57 of the concave portions 56a, 56b. Because of this structure, the shutter 60 is held in the concave portions 56a, 56b so as to sandwich the upper half 53a and the lower half 53b. The shutter 60 is movable in directions indicated by arrows K and L. The clicks 62 can be inserted in a slit 58 formed in the case where the upper half 53a is placed on the lower half 53b.

As shown in FIG. 15, a guide groove 66 is formed on one side of the cartridge box 52 in the vicinity of the head slits 55a, 55b. The guide groove 66 is curved so as to have a bend angle of 90 degrees and is connected to an opening groove 59 formed on an outside face of the cartridge box 52 (see FIG. 14). In the guide groove 66, a flexible slider 63 is movably held. The slider 63 has engaging holes 64 into which the clicks 62 of the shutter 60 are inserted. Thus, the shutter 60 is fixed to the cartridge box 52 via the slider 63. The slider 63 has a projection 65 on the side of the opening groove 59 of the cartridge box 52. The projection 65 engages the shutter opener of a cartridge holder in a drive device to allow the slider 63 to move.

A tension coiled spring 67 is stretchably provided in a space between the slider 63 and a disk housing 68 of the cartridge box 52. One end of the tension coiled spring 67 is fixed to the center of the slider 63 and the other end thereof is fixed to the lower half 53b. Because of this structure, the tension coiled spring 67 is pulled in a direction indicated by the arrow L so that the shutter 60 covers the center holes 54a, 54b and head slits 55a, 55b. When the shutter opener is inserted in the opening groove 59, the projection 65 comes into contact with the shutter opener, and the shutter 60 moves in the direction indicated by the arrow K so that the center holes 54a, 54b of the shutter 60 and the head slits 55a, 55b are opened.

Hereinafter, the construction of the cartridge will be described.

A disk 51 is placed in the disk housing 68 of the lower half 53b and the slider 63 is inserted into the guide groove 66. Thereafter, one end of the tension coiled spring 67 is fixed to the center of the slider 63 and the other end thereof is fixed to the lower half 53b. Under this condition, the upper half 53a is placed on the lower half 53b, and these halves 53a, 53b are fixed with screws and the like. Then, the shutter 60 is provided to the slider 63 so as to sandwich the concave portions 56a, 56b to complete a cartridge.

Next, another conventional example of a cartridge in accordance with International Standards for a 90 mm optical disk will be described with reference to FIG. 16.

A slider 72 is provided in a cartridge box 71. A shutter 73 is slidable along the slider 72. The cartridge box 71 has an opening 74 on its front face, through which a twisted coiled spring 75 can be inserted. One end of the twisted coiled spring 75 is fixed to the cartridge box 71 and the other end of the twisted coiled spring 75 is fixed to the slider 72, whereby the twisted coiled spring 75 pushes the slider 72.

The above-mentioned first example of the conventional cartridge has the following problems:

(1) It is difficult to construct the cartridge: When the cartridge is constructed, the upper half 53a should be placed on the lower half 53b under the condition that the tension coiled spring 67 is stretched (i.e., the tension coiled spring 67 pulls the slider 63 in the direction indicated by the arrow L). Under this condition, the slider 63 is likely to come out of the lower half 53b, since the slider 63 is guided only by the guide groove 66 of the lower half 53b. For example, in the case where slight shock is applied to the lower half 53b at a time when the upper half 53a is placed on the lower half 53b, the slider 63 and the tension coiled spring 67 Jump out of the lower half 53b.

(2) The tension coiled spring 67 or the slider 63 may jump out of the lower half 53b, bump against the disk 51 stored in the lower half 53b, and cause damage to the disk 51.

(3) The structure of this cartridge is unsuitable for miniaturizing the cartridge. That is, this structure requires a space for the movement of the tension coiled spring 67 in the cartridge box 52, resulting in the large depth for the cartridge.

As for the second example of the conventional cartridge, it is relatively easy to construct the cartridge. However, the opening 74 is not closed after the completion of the cartridge; therefore, there is a possibility that dust or the like enters the cartridge box 71 to cause difficulties in opening or closing the shutter 73. In addition, the twisted coiled spring 75 can be caught from outside of the cartridge box 71, so that the twisted coiled spring 75 is easily removed causing damage to the function of the cartridge.

SUMMARY OF THE INVENTION

The disk cartridge rotatably accommodating a disk of this invention, comprises: a cartridge box composed of an upper half and a lower half, including a center hole for receiving a motor for rotating the disk, a head slit for receiving a recording and playback head, and a window on its side wall; a shutter movably provided on the cartridge box, for opening or closing at least the head slit; a slide member covering the window, connected to the shutter and slidably guided inside the cartridge box so that the shutter moves in a direction for opening or closing the head slit; and an elastic body which is provided inside the cartridge box so as to pass thorough the window, one end of the elastic body being fixed to the cartridge box and the other end thereof being fixed to the slide member, the elastic body pushing the shutter in a direction for closing the head slit.

In one embodiment of the present invention, the slide member comprises a slider positioned at one side wall of the cartridge box, and an opener belt movably guided along a guide groove provided over two side walls including the one side wall so as to cover a corner of the cartridge box, one end of the opener belt being engaged with the slider.

In another embodiment of the present invention, the slider has a projection, the opener belt has an engaging hole, and the slider and the opener belt are engaged with each other by the engagement of the projection with the engaging hole.

In still another embodiment of the present invention, the shutter covers an engaged region where the slider is engaged with the opener belt.

In still another embodiment of the present invention, a width of the opener belt in the vicinity of an engaged region with the slider is smaller than a width of the window.

In still another embodiment of the present invention, the slider has at least two projections, the opener belt has at least one engaging through hole at one end, the shutter has at least two holes, and the at least two projections of the slider are engaged with the at least two holes of the shutter through the at least one engaging through hole of the opener belt, whereby the shutter is engaged with the slider member.

In still another embodiment of the present invention, the window has an opening into which the opener belt is inserted.

In still another embodiment of the present invention, the elastic body is a twisted coiled spring.

According to another aspect of the present invention, a method for constructing a disk cartridge, comprises the steps of: placing a disk in either one of an upper half or a lower half, the upper half and the lower half composing a cartridge box having a center hole for receiving a motor for rotating the disk, a head slit for receiving a recording and playback head, and a window on its side wall; inserting a slider into a first guide groove provided on one side wall of the one of the halves; inserting an opener belt into a second guide groove which is provided over two side walls including the one side wall so as to cover a corner of the one of the halves; placing the one of the halves provided with the disk, the slider, and the opener belt on the other of the halves to form the cartridge box; inserting an elastic body inside the cartridge box through the window and fixing one end of the elastic body to the cartridge box and the other end thereof to the slider; engaging one end of the slider with one end of the opener belt under a condition that the elastic body is inside the cartridge box; and attaching a shutter for opening or closing at least the head slit to the slider.

In one embodiment of the present invention, the slider has a projection, the opener belt has an engaging hole, and the engagement of the slider with the opener belt is conducted by engaging the projection with the engaging hole.

In still another embodiment of the present invention, the opener belt has a slope portion becoming thinner toward a tip end thereof and a flat portion connecting to the slope portion, the engaging hole of the opener belt is formed in the flat portion, and the engagement of the projection of the slider with the engaging hole of the opener belt is conducted by moving the slope portion of the opener belt along the second guide groove under a condition that the slope portion of the opener belt is in contact with an upper face of the projection of the slider.

In still another embodiment of the present invention, the opener belt has a flat portion which is capable of moving out of the window of the cartridge box, the flat portion being positioned in the vicinity of an end portion of the opener belt to be engaged with the slider and having a width smaller than a width of the window, and the elastic body is inserted inside the cartridge box through the window under a condition that the flat portion is moved out of the window.

In still another embodiment of the present invention, the slider has at least two projections, the opener belt has at least one engaging through hole at one end, the shutter has at least two holes, and the at least two projections of the slider are engaged with the at least two holes of the shutter through the at least one engaging through hole of the opener belt, whereby the shutter is engaged with the slider.

In still another embodiment of the present invention, the shutter is placed so as to cover an engaged region where the slider is engaged with the opener belt.

In still another embodiment of the present invention, the elastic body is a twisted coiled spring.

According to another aspect of the present invention, a method for constructing a disk cartridge, comprises the steps of: placing a disk in either one of an upper half or a lower half, the upper half and the lower half composing a cartridge box having a center hole for receiving a motor for rotating the disk, a head slit for receiving a recording and playback head, and a window including an opening on its side wall; inserting a slider into a first guide groove provided on one side wall of the one of the halves; placing the one of the halves provided with The disk, and the slider on the other of the halves to form the cartridge box; inserting an elastic body inside the cartridge box through the window and fixing one end of the elastic body to the cartridge box and the other end thereof to the slider; inserting an opener belt through the opening into a second guide groove which is provided over two side walls including the one side wall so as to cover a corner of the one of the halves, under a condition that the elastic body is inside the cartridge box; engaging one end of the slider with one end of the opener belt; and attaching a shutter for opening or closing at least the head slit to the slider.

In one embodiment of the present invention, the slider has a projection, the opener belt has an engaging hole, and the engagement of the slider with the opener belt is conducted by engaging the projection with the engaging hole.

In another embodiment of the present invention, the opener belt has a slope portion becoming thinner toward a tip end thereof and a flat portion connecting to the slope portion, the engaging hole of the opener belt is formed in the flat portion, and the engagement of the projection of the slider with the engaging hole of the opener belt is conducted by moving the slope portion of the opener belt along the second guide groove under a condition that the slope portion of the opener belt is in contact with an upper face of the projection of the slider.

In still another embodiment of the present invention, the slider has at least two projections, the opener belt has at least one engaging through hole at one end, the shutter has at least two holes, and the at least two projections of the slider are engaged with the at least two holes of the shutter through the at least one engaging through hole of the opener belt, whereby the shutter is engaged with the slider.

In still another embodiment of the present invention, the shutter is placed so as to cover an engaged region where the slider is engaged with the opener belt.

In still another embodiment of the present invention, the elastic body is a twisted coiled spring.

In the disk cartridge with the above-mentioned structure according to the present invention, the window of the disk cartridge is covered with the slide member, so that the shutter can be opened or closed in a stable manner at all times without allowing dust to enter therein. Since the twisted coiled spring cannot be removed from outside of the cartridge, there is no possibility that the twisted coiled spring is removed by mistake to damage the function of the cartridge thus increasing the reliability of the cartridge. In addition, because of the absence of a tension coiled spring, the cartridge of the present invention can have a depth smaller than that of the conventional cartridge having an opener belt, using a tension coiled spring. Thus, the disk cartridge of the present invention may be miniaturized.

In the construction of the disk cartridge of the present invention, the twisted coiled spring can be inserted after the upper half is placed on the lower half. Therefore, the components of the cartridge are not likely to be scattered during the construction of the disk cartridge, making it easy to construct the cartridge. This results in no possibility of damaging the disk by scattered components.

It is preferred that the opening for the insertion of the opener belt is provided at a corner of the window of the cartridge box so that the opener belt covers the opening when inserted. Because of this structure, the twisted coiled spring can be inserted and fixed without the interruption of the opener belt. After the twisted coiled spring is inserted, the opener belt is inserted along the opener belt guide groove. Therefore, the cartridge can be constructed more easily without damaging the opener belt, thus increasing the reliability of the cartridge.

Thus, the invention described herein makes possible the advantages of (1) providing a highly reliable disk cartridge which is not subjected to damage from dust or the like; (2) providing a highly reliable disk cartridge which prevents the disk from being damaged in the course of the production thereof; and (3) providing a method for constructing the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the drawings.

Example 1

The structure of a cartridge of the present example will be described with reference to FIGS. 1 to 5.

Figure 1:
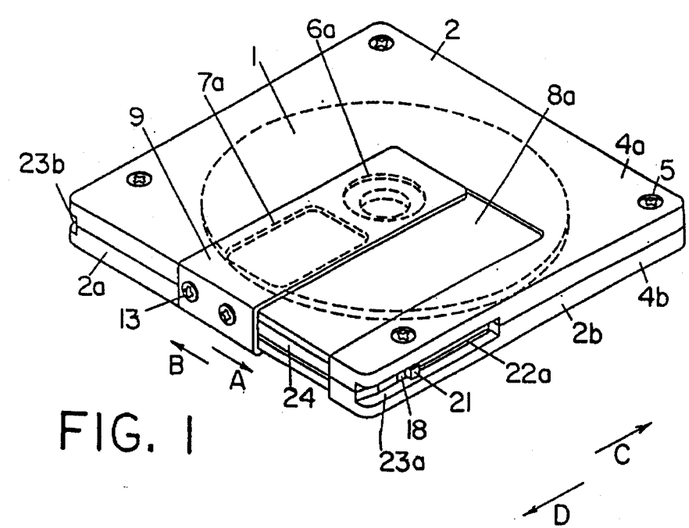
FIG. 1 is a perspective view of a disk cartridge of Example 1 according to the present invention.
Figure 2:
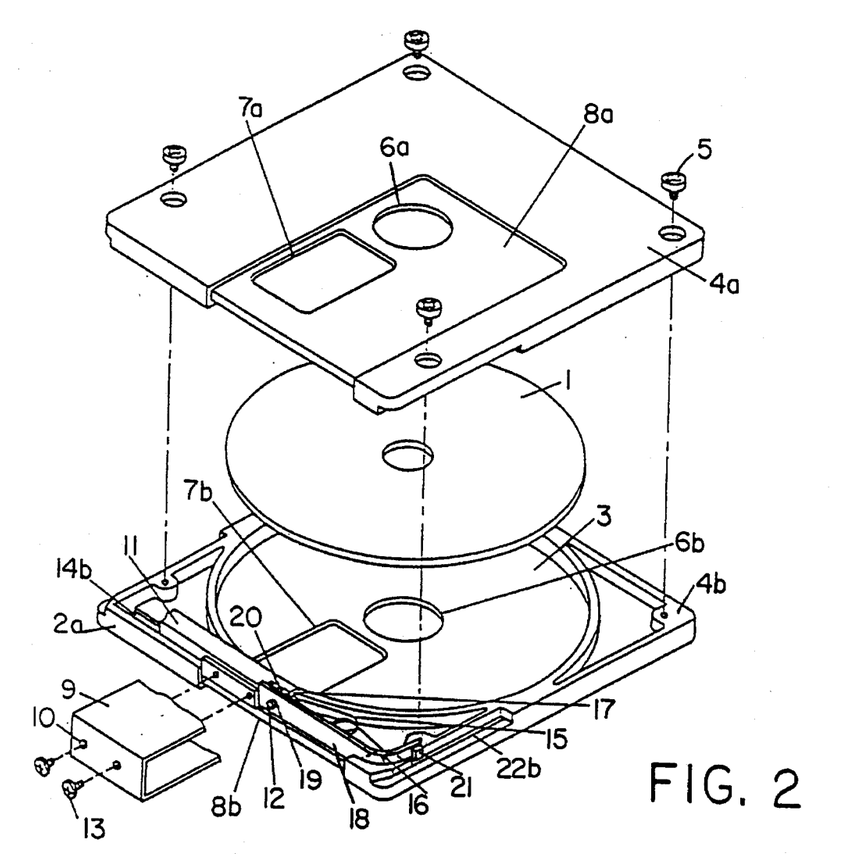
FIG. 2 is a exploded perspective view of the disk cartridge of Example 1 according to the present invention.

Referring to FIGS. 1 and 2, the cartridge of the present example includes a cartridge box 2 for rotatably accommodating an optical disk 1 in a housing 3. The cartridge box 2 is formed into a substantially rectangular shape consisting of an upper half 4a and a lower half 4b. The upper half 4a and the lower half 4b are fixed with screws 5 at the respective four corners. As shown in FIG. 2, the upper half 4a and the lower half 4b respectively have center holes 6a, 6b for receiving a motor, head slits 7a, 7b for receiving a head, and concave portions 8a, 8b facing each other. In the concave portions 8a, 8b, a shutter 9 (described later) can be inserted.

The cartridge of the present example has the shutter 9 consisting of three sheets (two of the sheets facing each other) for opening or closing the center holes 6a, 6b and the head slits 7a, 7b. The shutter 9 is inserted in the concave portions 8a, 8b and is slidable in directions indicated by arrows A and B, as shown in FIG. 1. Referring to FIG. 2, the shutter 9 has lock holes 10 for fixing the shutter 9 to a slider 11 (described later).

The cartridge of the present example further has the slider 11, twisted coiled spring 15, and an opener belt 18, as shown in FIG. 2. The shutter 9 is fixed to the slider 11 with set screws 13 through the lock holes 10. The slider 11 is guided by linear slider guide grooves 14a, 14b (see FIGS. 3 and 4) provided along a side face 2a of the cartridge box 2 and thus moved inside the cartridge box 2 to allow the shutter 9 to move. One end of the twisted coiled spring 15 is fixed to a spring peg groove 16 formed at a corner of the lower half 4b, and the other end of the twisted coiled spring 15 is fixed to a spring peg portion 17. Thus, the twisted coiled spring 15 pulls the slider 11 in a direction indicated by the arrow B in FIG. 1 so that the slider 11 covers the center holes 6a, 6b and the head slits 7a, 7b.

Figure 5:
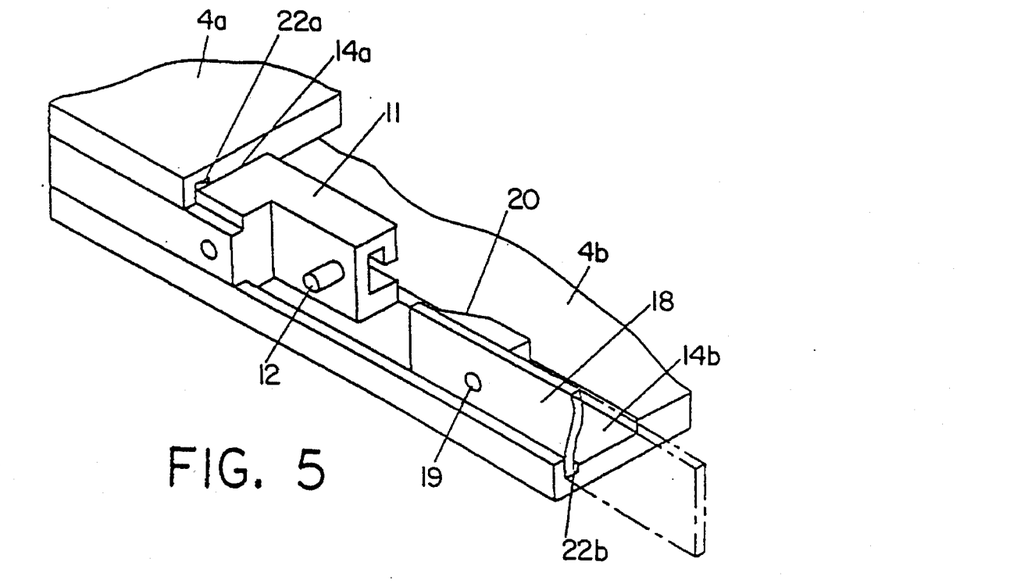
FIG. 5 is a structural view showing a main portion of the disk cartridge of Example 1 according to the present invention.

As shown in FIG. 5, the slider 11 has a projection 12 on its end portion so as to engage the opener belt 18. The opener belt 18 is in a ribbon shape and is made of resin having flexibility such as polyacetal. The opener belt 18 has a slope portion 20 at one end and an engaging hole 19 to be engaged with the projection 12 of the slider 11. The slope portion 20 becomes thinner toward the end of the opener belt 18. The engaging hole 19 is formed on a flat part of the slope portion 20. The shutter 9 is fixed so as to cover an engaged region where the projection 12 of the slider 11 is engaged with the engaging hole 19 of the opener belt 18. Thus, the shutter 9 is fixed to the slider 11 so as to sandwich the opener belt 18, preventing the opener belt 18 from coming out of the slider 11.

Figure 3:
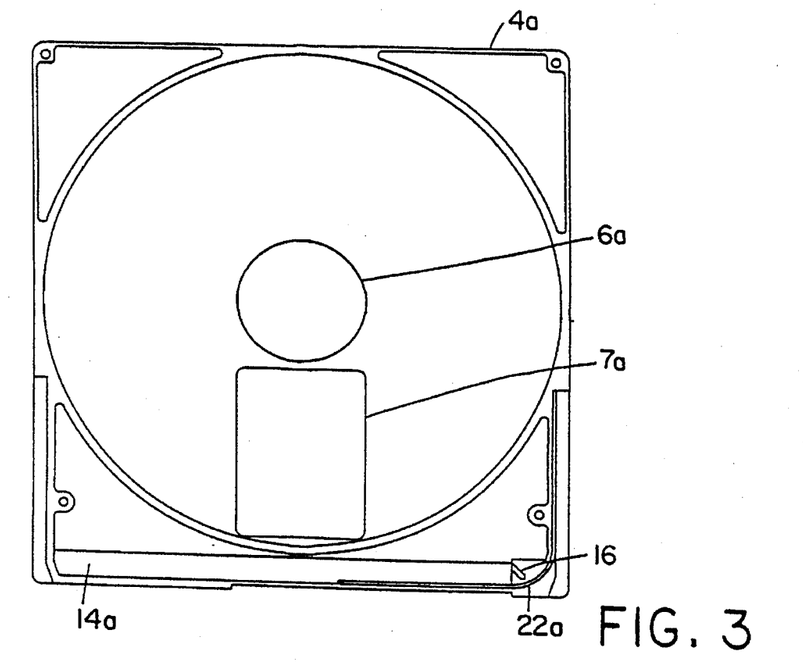
FIG. 3 is a plan view of an upper half of the disk cartridge of Example 1 according to the present invention.
Figure 4:
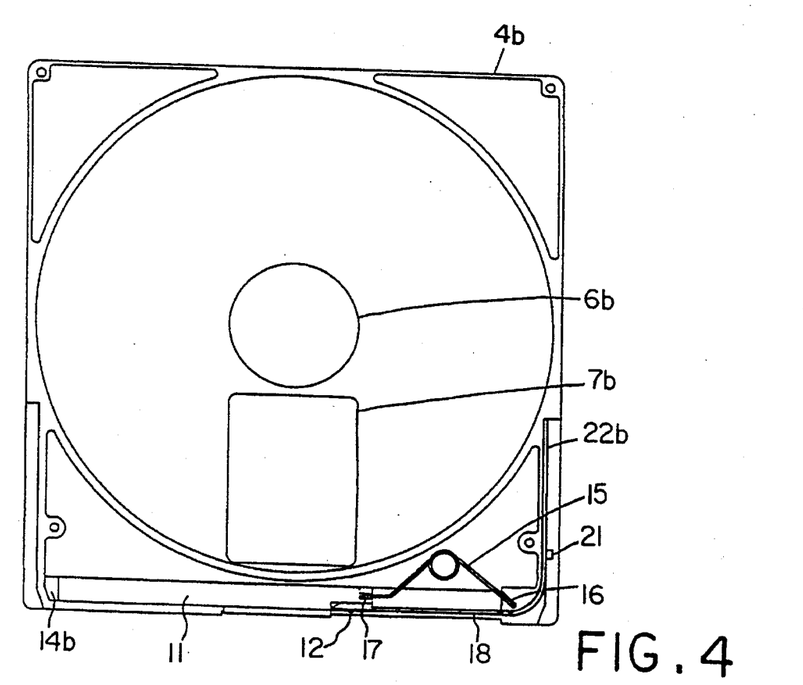
FIG. 4 is a plan view of a lower half of the disk cartridge of Example 1 according to the present invention.

As shown in FIGS. 3 and 4, the opener belt 18 is guided along opener belt guide grooves 22a, 22b formed respectively on the upper and lower halves 4a and 4b as a pair of grooves facing each other. The opener belt guide grooves 22a, 22b extend from the inside of slider guide grooves 14a, 14b through a corner portion of the cartridge box 2 to an opening groove 23a formed on a side face 2b (see FIG. 1). The opener belt 18 further has an opener projection 21. The opener projection 21 can be abutted against a click, which is provided in a drive device, for opening or closing the shutter 9. The opener projection 21 is formed so as to expose outside from the opening groove 23a. Thus, when the click of the drive device is inserted in the opening groove 23a, the opener projection 21 comes into contact with the click end the opener belt 18 moves in a direction indicated by an arrow C in FIG. 1.

As shown in FIG. 1, the cartridge box 2 has a second opening groove 23b facing the opening groove 23a. Because of this structure, the operation of a double sided disk can be realized. The cartridge box 2 further has a window 24 on the side face 2a. The window 24, which is formed in the case where the upper half 4a is placed on the lower half 4b, enables the twisted coiled spring 15 to be inserted from outside of the cartridge box 2.

Hereinafter, the operation of the disk cartridge having the above-mentioned structure will be described with reference to FIG. 1.

When the disk cartridge is not used, the shutter 9 is pulled in the direction indicated by the arrow B by the twisted coiled spring 15 fixed to the slider 11, thereby closing the center holes 6a, 6b and the head slits 7a, 7b. Thus, the center holes 6a, 6b and head slits 7a, 7b are protected from dust from outside, as well as preventing the optical disk 1 from being damaged due to careless handling.

When the disk cartridge is placed in the drive device, a first click of the drive device comes into contact with the opener projection 21 of the opener belt 18 to allow the opener belt 18 to move in the direction indicated by the arrow C. Since the opener belt 18 is engaged with the slider 11, the slider 11 moves in the direction indicated by the arrow A overcoming the force of the twisted coiled spring 15, with the movement of the opener belt 18. Thus, the shutter 9 moves in the direction indicated by the arrow A to open the center holes 6a, 6b and the head slits 7a, 7b, enabling a motor and a recording and playback head to be inserted therein. The window 24 of the cartridge box 2 is covered with the shutter 9 or the opener belt 18 at all times, so that dust or the like is not likely to enter the cartridge box 2 and the twisted coiled spring 15 is not likely to come out. When the disk cartridge is placed upside down in the drive device, a second click of the drive device comes into contact with the opener projection 21 of the opener belt 18 and the first click is inserted in the second opening groove 23b so as not to come into contact with the cartridge box 2. Therefore, the same operation as mentioned above of a double sided disk can be realized.

Hereinafter, the construction of the disk cartridge of the present example will be described with reference to FIGS. 2 to 7.

Referring to FIGS. 2 and 4, the disk 1 is placed in the housing 3; the slider 11 is placed in the slider guide groove 14b; and the opener belt 18 is placed in the opener belt guide groove 22b so that the opener projection 21 is exposed outside from the opening groove 23a. At this time, the twisted coiled spring 15 is not yet inserted. Thereafter, the upper half 4a is placed on the lower half 4b and fixed with the screws 5.

Figure 6:
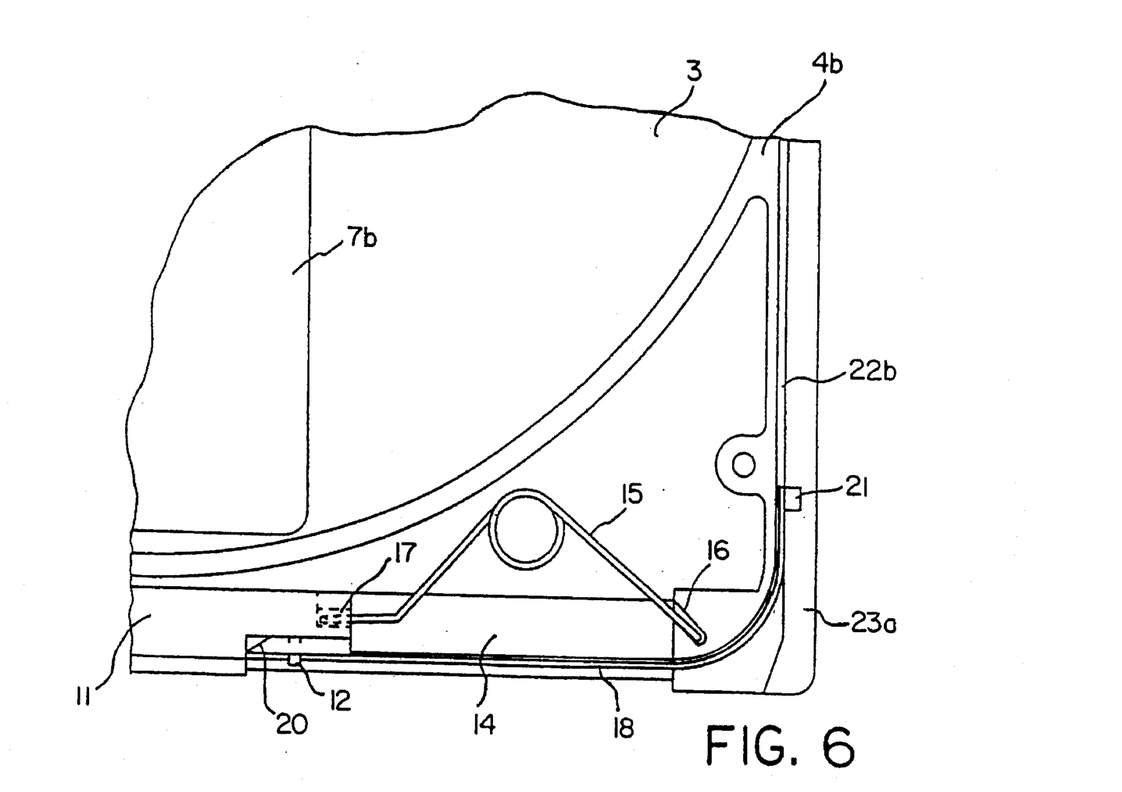
FIG. 6 is a plan view showing a main portion of the disk cartridge of Example 1 according to the present invention.
Figure 7:
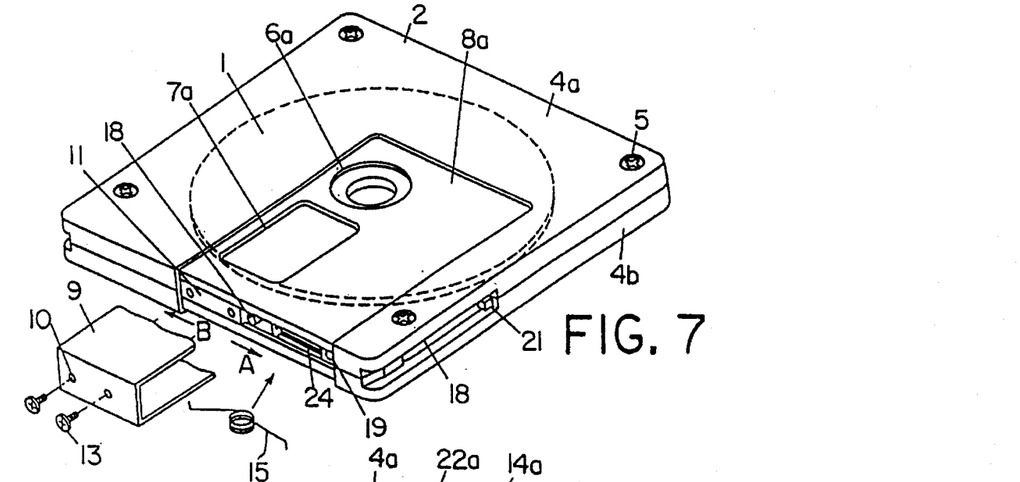
FIG. 7 shows a process for constructing the disk cartridge of Example 1 according to the present invention.

As shown in FIG. 7, the slider 11 is moved in the direction indicated by the arrow B, and the opener belt 18 is moved in the direction indicated by the arrow A, thereby allowing the twisted coiled spring 15 to be inserted in the cartridge box 2 through the window 24. Then, as shown in FIGS. 4 and 6, one end of the twisted coiled spring 15 is fixed to the spring peg groove 16, and the other end thereof is fixed to the spring peg portion 17. The slider 11 or the opener belt 18 is moved. Thereafter, the projection 12 of the slider 11 is brought into contact with the slope portion 20 of the opener belt 18, and the slider 11 or the opener belt 18 is further moved until the projection 12 of the slider 11 is engaged with the engaging hole 19.

The shutter 9 is fixed to the slider 11 by inserting the set screws 13 into the lock holes 10 so that the shutter 9 covers the engaged region of the slider 11 and the opener belt 18. Thus, the construction of the disk cartridge is completed.

As described above, according to the present example, since the twisted coiled spring 15 is inserted into the cartridge box 2 after the upper half 4a is placed on the lower half 4b, components of the cartridge are not scattered from the cartridge box 2 during the construction of the cartridge, resulting in the easy construction of the cartridge. In addition, there is no possibility that any components scattered during the construction of the cartridge might damage the disk 1 by bumping against it. Moreover, in the completed disk cartridge, the window 24 is tightly sealed with the opener belt 18, preventing dust or the like from entering from the outside. Thus, the shutter 9 can be opened or closed in a stable condition at all times. Further, the twisted coiled spring 15 cannot be removed from outside of the cartridge; therefore, the twisted coiled spring 15 is not likely to be removed by mistake to damage the function of the cartridge. The shutter 9 covers the engaged region of the slider 11 and the opener belt 18, the opener belt 18 is not likely to be removed from the slider 11. Furthermore, a space for moving a tension coiled spring is not required, so that the cartridge can be miniaturized, compared with the conventional cartridge using a tension coiled spring.

Example 2

Figures 8, 9:
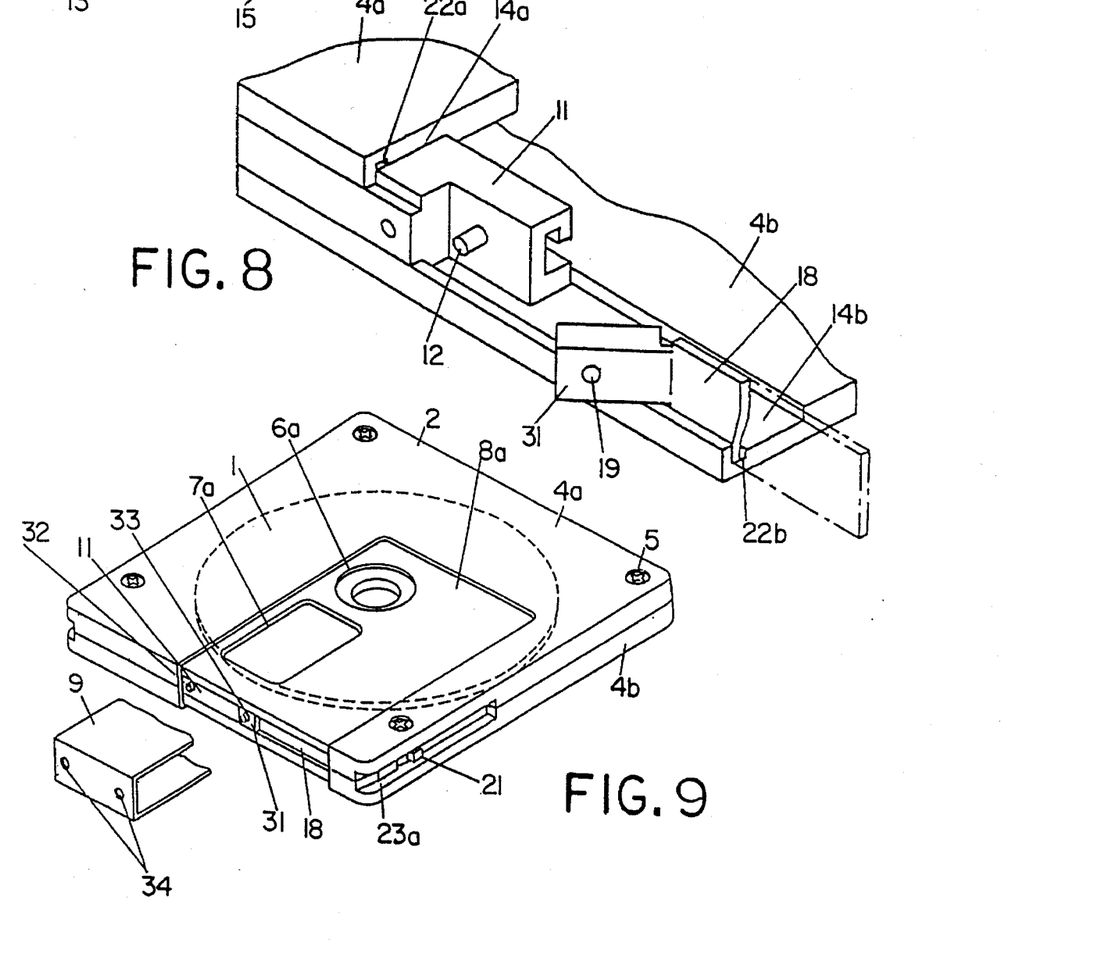
FIG. 8 is a structural view showing a main portion of a disk cartridge of Example 2 according to the present invention.
FIG. 9 is a perspective view of the disk cartridge of Example 3 according to the present invention.

A disk cartridge of the second example according the present invention will be described with reference to FIG. 8. The identical components to those of Example 1 bear the identical reference numerals thereto. The descriptions thereof will be omitted.

In the disk cartridge of the present example, the width of an end portion 31 of the opener belt 18 is set to be smaller than that of the window 24 of the cartridge box 2, so that the end portion 31 can move out of the window 24. The end portion 31 has the engaging hole 19 which engages the projection 12 of the slider 11. The structure of the other components is the same as that of Example 1.

Advantages of the structure of the present example will be described.

Since the opener belt 18 has the above-mentioned structure, the end portion 31 of the opener belt 18 can be moved out of the window 24 during the construction of the cartridge. This makes the size of the window 24 larger; as a result, the twisted coiled spring 15 can be inserted into the cartridge box 2 more easily, compared with Example 1. In addition, the spring peg groove 16 of the cartridge box 2 can be seen more easily from outside of the cartridge box 2, the twisted coiled spring 15 can be fixed to the spring peg groove 16 more easily. The projection 12 of the slider 11 can be inserted into the engaging hole 19 of the opener belt 18 in an engaging direction. For this reason, the opener belt 18 can be engaged with the slider 11 without being deformed.

As described above, according to the present example, the disk cartridge can be constructed more easily than Example 1.

Example 3

A disk cartridge of the third example according to the present invention will be described with reference to FIG. 9. The identical components to those of Examples 1 and 2 bear the identical reference numerals thereto. The descriptions thereof will be omitted.

The slider 11 has a first projection 32 and a second projection 33. The second projection 33 engages the engaging hole 19 of the opener belt 18 so as to project from the engaging hole 19. The projections 33 are made of thermoplastic material such as resin. The shutter 9 has two holes 34 respectively engaging the first projection 32 and the second projection 33 of the slider 11. The length of the first and second projections 32 and 33 is set so as to slightly project from the holes 34 of the shutter 9, when the shutter 9 is attached to the cartridge box 2. The structure of the other components is the same as that of Example 2.

The construction of the above-mentioned cartridge of the present example will be described.

The slider 11 is engaged with the opener belt 18 in the process similar to that of Example 2. Thereafter, the first and second projections 32 and 33 of the slider 11 are inserted into the holes 34 of the shutter 9. At this time, the first and second projections 32 and 33 of the slider 11 are slightly projected from the holes 34. The slightly projected portions of the first and second projections 32 and 33 are thermally deformed, thereby fixing the shutter 9 to the slider 11. Thus, the construction of the cartridge is completed.

As described above, the first and second projections 32 and 33 can also be used for fixing the shutter 9 to the slider 11, so that the cartridge can be constructed more easily and the opener belt 18 is not likely to come out of the slider 9. The cartridge of the present example is effective, particularly in the case where the completed cartridge is not required to be disassembled.

Example 4

A disk cartridge of the fourth example according to the present invention will be described with reference to FIGS. 10 to 13. The identical components to those of Examples 1 and 2 bear the identical reference numerals thereto. The descriptions thereof will be omitted.

Figure 10:
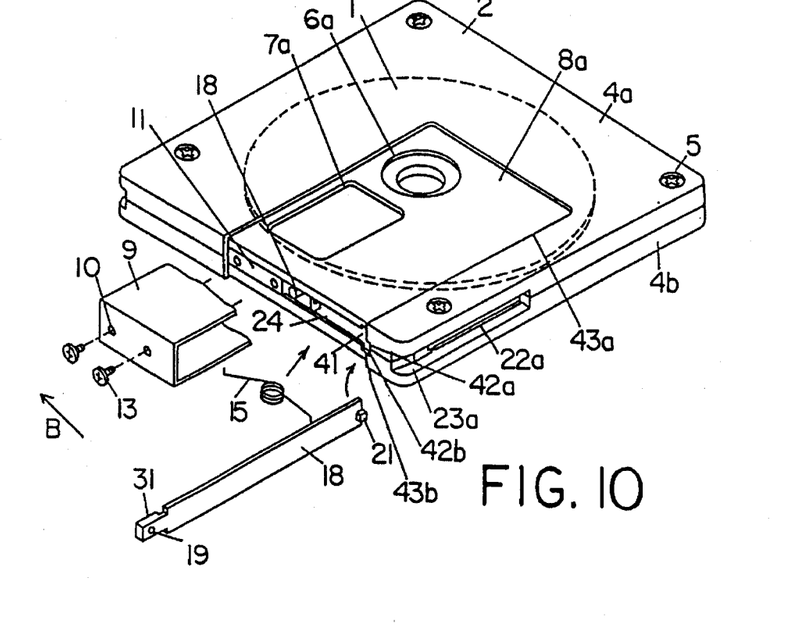
FIG. 10 is an exploded perspective view of a disk cartridge of Example 4 according to the present invention.
Figure 11:
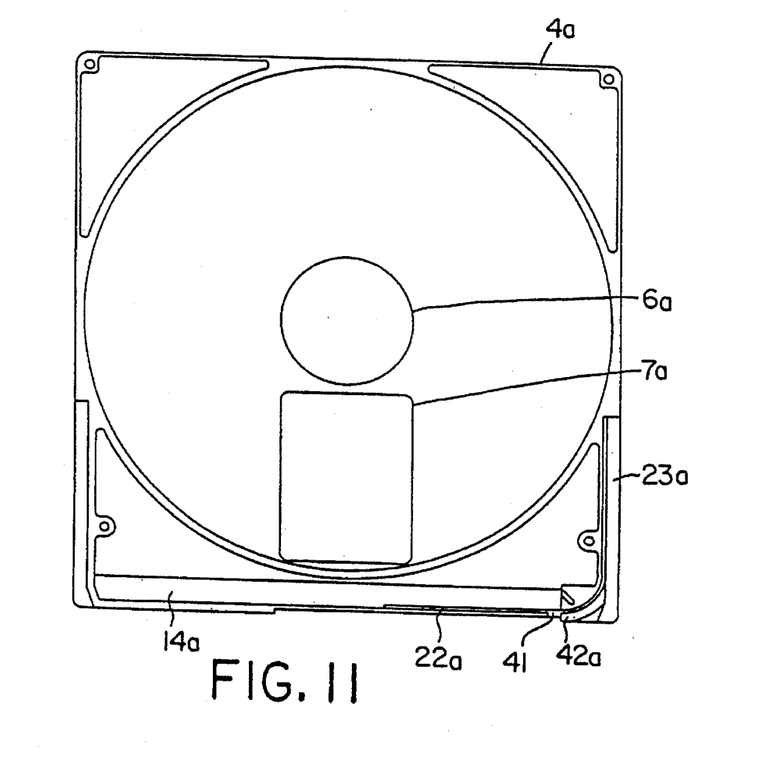
FIG. 11 is a plan view of an upper half of the disk cartridge of Example 4 according to the present invention.
Figure 12:
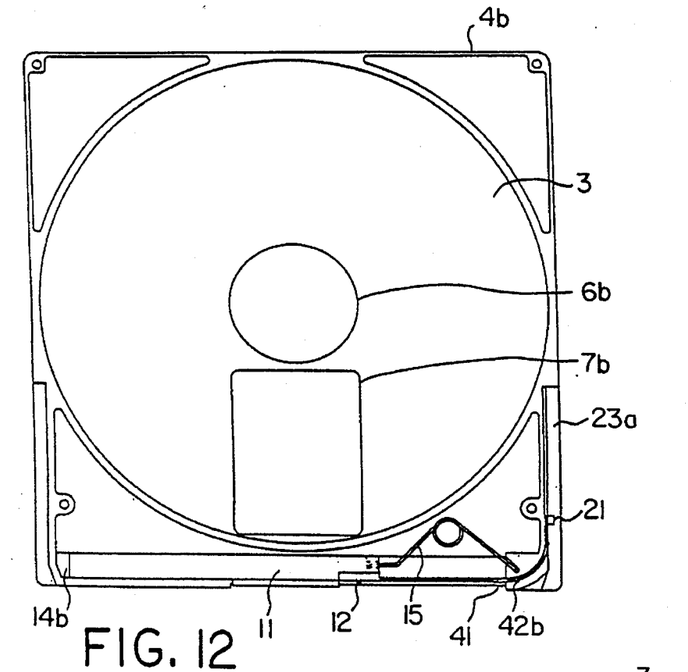
FIG. 12 is a plan view of a lower half of the disk cartridge of Example 4 according to the present invention.

Referring to FIG. 10, the window 24 of the cartridge box 2 has en opening 41 at a corner of the cartridge box 2, the opening 41 having a width slightly larger than that of the opener belt 18. The opening 41 is positioned along edge portions 43a, 43b (which limit the movement of the shutter 9) of the concave portions 8a, 8b of the upper half 4a and the lower half 4b. More specifically, the opening portion 41 is positioned so as to be inside the edge portions 43a, 43b. When the shutter 9 is attached to the concave portions 8a, 8b, the opener belt 18 covers the opening 41 of the window 24. As shown in FIGS. 11 and 19-, the upper half 4a and the lower half 4b respectively have stepped portions 42a, 42b along the opener belt guide grooves 22a, 22b. Because of this structure, the projection 21 of the opener belt 18 can pass through the space formed by the stepped portions 42a, 42b, in the case where the upper half 4a is placed on the lower half 4b.

Hereinafter, the construction of the disk cartridge of the present example will be described.

Figure 13:
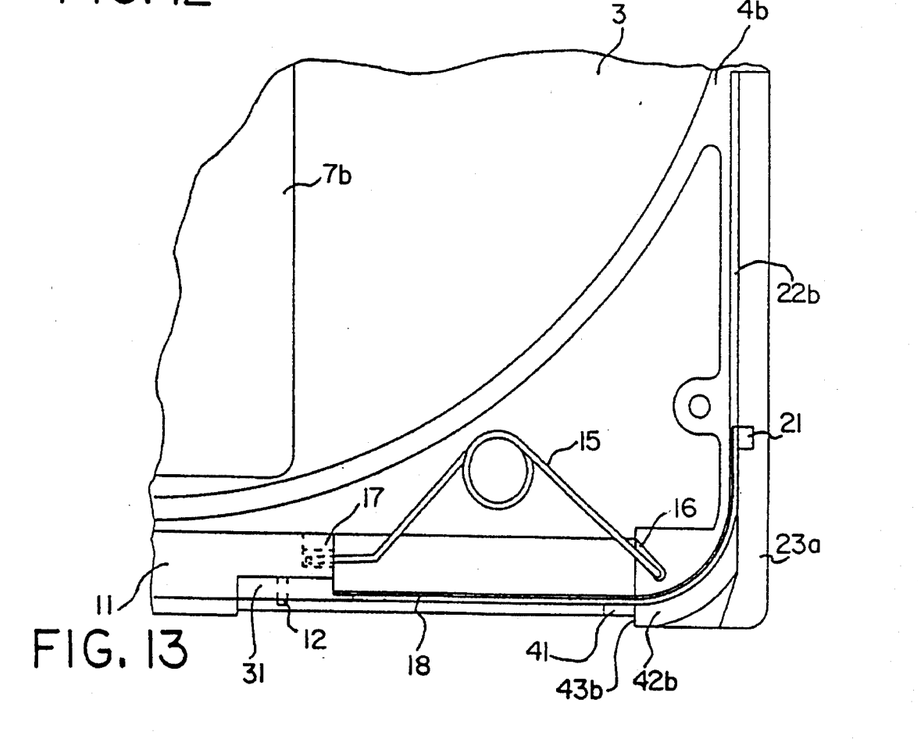
FIG. 13 is a structural view showing a main portion of the disk cartridge of Example 4 according to the present invention.

The disk 1 is placed in the housing 3; and the slider 11 is placed in the slider guide groove 14b (see FIG. 12). Thereafter, the upper half 4a is placed on the lower half 4b and fixed with the screws 5 as shown in FIG. 10. The slider 11 is moved in the direction indicated by the arrow B, and the twisted coiled spring 15 is inserted into the cartridge box 2 through the window 24. One end of the twisted coiled spring 15 is fixed to the spring peg groove 16 of the cartridge box 2 and the other end thereof is fixed to the spring peg portion 17 of the slider 11, as shown in FIGS. 12 and 13.

Next, the opener belt 18 is inserted into the opener belt guide grooves 22a, 22b through the opening 41 of the window 24. The opener projection 21 of the opener belt 18 passes through the space formed by the stepped portions 42a, 42b and is guided into the guide groove 23a of the cartridge box 2. Thereafter, the slider 11 or the opener belt 18 is moved, and the projection 12 of the slider 11 is inserted into the engaging hole 19 of the opener belt 18 in an engaging direction.

The shutter 9 is fixed to the slider 11 by inserting the set screws 13 into the lock holes 10. Thus, the construction of the disk cartridge of the present example is completed.

As described above, in the disk cartridge of the present example, the twisted coiled spring 15 can be inserted into the cartridge box 2 more easily because of the absence of the interruption of the opener belt 18. The twisted coiled spring 15 can be easily fixed to the spring peg portion 17 of the cartridge box 2. The guide grooves 22a, 22b function as guide grooves for the opener belt 18, so that the opener belt 18 can be inserted along the guide grooves 22a, 22b. Thus, the opener belt 18 can be more easily inserted into the cartridge box 2 without being damaged, compared with the case where the guide groove 22b is inserted into the opener belt 18 under the condition that the guide groove 22a of the lower half 4b is engaged with the opener belt 18. In addition, the opener belt 18 moves so as to cover the opening 41 of the window 24 at all times, under the condition that the shutter 9 is attached to the slider 11; therefore, there is no possibility that the opener belt 18 is stuck at the opening 41 to cause malfunction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk cartridge rotatably accommodating a disk, comprising:

a cartridge box composed of an upper half and a lower half, including a center hole for receiving a motor for rotating the disk, a head slit for receiving a recording and playback head, and a window on its side wall;

a shutter movably provided on the cartridge box, for opening or closing at least the head slit;

a slide member covering the window, connected to the shutter and slidably guided inside the cartridge box so that the shutter moves in a direction for opening or closing the head slit, the slide member comprising a slider positioned at one side wall of the cartridge box, and an opener belt movably guided along a guide groove provided over two side walls including the one side wall having the window so as to cover a corner of the cartridge box, one end of the opener belt engaging the slider; and an elastic body which is provided inside the cartridge box and faces the window, one end of the elastic body being fixed to the cartridge box and the other end thereof being fixed to the slide member, the elastic body pushing the shutter in a direction for closing the head slit, wherein the slider has at least two projections, the opener belt has at least one engaging through hole at one end, the shutter has at least two holes, and the at least two projections of the slider are engaged with the at least two holes of the shutter through the at least one engaging through hole of the opener belt, whereby the shutter is engaged with the slider member.

2. A disk cartridge according to claim 1, wherein the shutter covers an engaged region where the slider is engaged with the opener belt.

3. A disk cartridge according to claim 1, wherein a width of the opener belt in the vicinity of an engaged region with the slider is smaller than a width of the window.

4. A disk cartridge according to claim 1, wherein the window has an opening into which the opener belt is inserted.

5. A disk cartridge according to claim 1, wherein the elastic body is a twisted coiled spring.

6. A method for constructing a disk cartridge, comprising the steps of:

placing a disk in either one of an upper half or a lower half, the upper half and the lower half composing a cartridge box having a center hole for receiving a motor for rotating the disk, a head slit for receiving a recording and playback head, and a window on its side wall;

inserting a slider into a first guide groove provided on one side wall of the one of the halves;

inserting an opener belt into a second guide groove which is provided over two side walls including the one side wall so as to cover a corner of the one of the halves;

placing the one of the halves provided with the disk, the slider, and the opener belt on the other of the halves to form the cartridge box;

inserting an elastic body inside the cartridge box through the window and fixing one end of the elastic body to the cartridge box and the other end thereof to the slider;

engaging one end of the slider with one end of the opener belt under a condition that the elastic body is inside the cartridge box; and attaching a shutter for opening or closing at least the head slit to the slider.

7. A method for constructing a disk cartridge according to claim 6, wherein the slider has a projection, the opener belt has an engaging hole, and the engagement of the slider with the opener belt is conducted by engaging the projection with the engaging hole.

8. A method for constructing a disk cartridge according to claim 7, wherein the opener belt has a slope portion becoming thinner toward a tip end thereof and a flat portion connecting to the slope portion, the engaging hole of the opener belt is formed in the flat portion, and the engagement of the projection of the slider with the engaging hole of the opener belt is conducted by moving the slope portion of the opener belt along the second guide groove under a condition that the slope portion of the opener belt is in contact with an upper face of the projection of the slider.

9. A method for constructing a disk cartridge according to claim 7, wherein the opener belt has a flat portion which is capable of moving out of the window of the cartridge box, the flat portion being positioned in the vicinity of an end portion of the opener belt to be engaged with the slider and having a width smaller than a width of the window, and the elastic body is inserted inside the cartridge box through the window under a condition that the flat portion is moved out of the window.

10. A method for constructing a disk cartridge according to claim 6, wherein the slider has at least two projections, the opener belt has at least one engaging through hole at one end, the shutter has at least two holes, and the at least two projections of the slider are engaged with the at least two holes of the shutter through the at least one engaging through hole of the opener belt, whereby the shutter is engaged with the slider.

11. A method for constructing a disk cartridge according to claim 6, wherein the shutter is placed so as to cover an engaged region where the slider is engaged with the opener belt.

12. A method for constructing a disk cartridge according to claim 6, wherein the elastic body is a twisted coiled spring.

13. A method for constructing a disk cartridge, comprising the steps of:

placing a disk in either one of an upper half or a lower half, the upper half and the lower half composing a cartridge box having a center hole for receiving a motor for rotating the disk, a head slit for receiving a recording and playback head, and a window including an opening on its side wall;

inserting a slider into a first guide groove provided on one side wall of the one of the halves;

placing the one of the halves provided with the disk, and the slider on the other of the halves to form the cartridge box;

inserting an elastic body inside the cartridge box through the window and fixing one end of the elastic body to the cartridge box and the other end thereof to the slider;

inserting an opener belt through the opening into a second guide groove which is provided over two side walls including the one side wall so as to cover a corner of the one of the halves, under a condition that the elastic body is inside the cartridge box;

engaging one end of the slider with one end of the opener belt; and attaching a shutter for opening or closing at least the head slit to the slider.

14. A method for constructing a disk cartridge according to claim 13, wherein the slider has a projection, the opener belt has an engaging hole, and the engagement of the slider with the opener belt is conducted by engaging the projection with the engaging hole.

15. A method for constructing a disk cartridge according to claim 14, wherein the opener belt has a slope portion becoming thinner toward a tip end thereof and a flat portion connecting to the slope portion, the engaging hole of the opener belt is formed in the flat portion, and the engagement of the projection of the slider with the engaging hole of the opener belt is conducted by moving the slope portion of the opener belt along the second guide groove under a condition that the slope portion of the opener belt is in contact with an upper face of the projection of the slider.

16. A method for constructing a disk cartridge according to claim 13, wherein the slider has at least two projections, the opener belt has at least one engaging through hole at one end, the shutter has at least two holes, and the at least two projections of the slider are engaged with the at least two holes of the shutter through the at least one engaging through hole of the opener belt, whereby the shutter is engaged with the slider.

17. A method for constructing a disk cartridge according to claim 13, wherein the shutter is placed so as to cover an engaged region where the slider is engaged with the opener belt.

18. A method for constructing a disk cartridge according to claim 13, wherein the elastic body is a twisted coiled spring.

19. A disk cartridge rotatably accommodating a disk, comprising:

a cartridge box composed of an upper half and a lower half, including a center hole for receiving a motor for rotating the disk, a head slit for receiving a recording and playback head, and a side wall having a window;

a shutter movably provided on the cartridge box, the shutter including sheet portions for opening or closing at least the head slit, and connecting portions;

a slide member covering the window, connected to the shutter through the connecting portions of the shutter and slidably guided inside the cartridge box so that the shutter moves in a direction for opening or closing the head slit; and an elastic body which is provided inside the cartridge box so as to pass through the window, one end of the elastic body being fixed to the cartridge box and the other end thereof being fixed to the slide member, the elastic body pushing the shutter in a direction for closing the head slit, wherein the slide member comprises a slider positioned at the side wall having the window, and an opener belt movably guided along a guide groove provided over two side walls including the side wall having the window so as to cover a corner of the cartridge box, one end of the opener belt including engagement means for engaging the opener belt with the slider to cover the window and the elastic body subsequent to the elastic body being provided inside the cartridge box via the window.

20. A disk cartridge according to claim 19, wherein the slider has a projection, the engagement means of the opener belt is an engaging hole, and the slider and the opener belt are engaged with each other by the engagement of the projection with the engaging hole.

21. A disk cartridge according to claim 19, wherein the window has an opening into which the opener belt is inserted.

22. A disk cartridge according to claim 19, wherein the elastic body is a twisted coil spring.

* * * * *